US012641046B1

(12) United States Patent
Schlecht

(10) Patent No.: US 12,641,046 B1
(45) Date of Patent: May 26, 2026

(54) METHODS FOR PROVIDING CONTEXTUALIZED RESPONSES USING AN ARTIFICIAL INTELLIGENCE MODEL WITHIN AN EMAIL ACCOUNT

(71) Applicant: C A Schlecht, Lookout Mountain, TN (US)

(72) Inventor: C A Schlecht, Lookout Mountain, TN (US)

(73) Assignee: Matilda IP Holdings LLC, Lookout Mountain, TN (US)

( * ) Notice: Subject to any disclaimer, the term of this patent is extended or adjusted under 35 U.S.C. 154(b) by 42 days.

(21) Appl. No.: 18/653,911

(22) Filed: May 2, 2024

Related U.S. Application Data

(60) Provisional application No. 63/499,545, filed on May 2, 2023.

(51) Int. Cl.
*H04L 51/21* (2022.01)
*H04L 51/02* (2022.01)
(52) U.S. Cl.
CPC .............. *H04L 51/21* (2022.05); *H04L 51/02* (2013.01)
(58) Field of Classification Search
CPC ................................ H04L 51/21; H04L 51/02
See application file for complete search history.

(56) References Cited

U.S. PATENT DOCUMENTS

| | | | |
|---|---|---|---|
| 11,947,902 B1 * | 4/2024 | Grimshaw | .............. G06F 40/56 |
| 2014/0359480 A1 * | 12/2014 | Vellal | .................... H04L 51/212 |
| | | | 715/752 |
| 2024/0236094 A1 * | 7/2024 | Beaver | .................... H04L 63/10 |

* cited by examiner

*Primary Examiner* — Soe Hlaing

(74) *Attorney, Agent, or Firm* — Midtown Intellectual Property, PC; C A Schlecht

(57) ABSTRACT

Provided herein are systems, methods, and non-transient computer-readable storage media for providing contextualized responses using a virtual coworker within an email account. The disclosed techniques access an email thread, set a conversation context window to encompass the entire email thread, identify contextually relevant keywords within the subject line and email body, and search the email account for related email messages. A context library is created, comprising the email message and related email messages found in the email account. A response is generated based on user input derived from the context library, using a combination of prompts derived from natural language analysis and pre-programmed prompts. Additional features include analyzing the context library to define user input, engineering the initial prompt for the response, incorporating a knowledge base, reading attachments, and implementing digital security measures.

16 Claims, 3 Drawing Sheets

Computing Platform(s)  102

Memory  124

Processor(s)  122

Machine-Readable Instruction(s)  106

Email Thread Accessing Module  108

Context Window Setting Module  110

Keywords Identifying Module  112

Email Account Searching Module  114

Context Library Creating Module  116

Response Generating Module  118

Remote Platform(s)  104

126

100

120

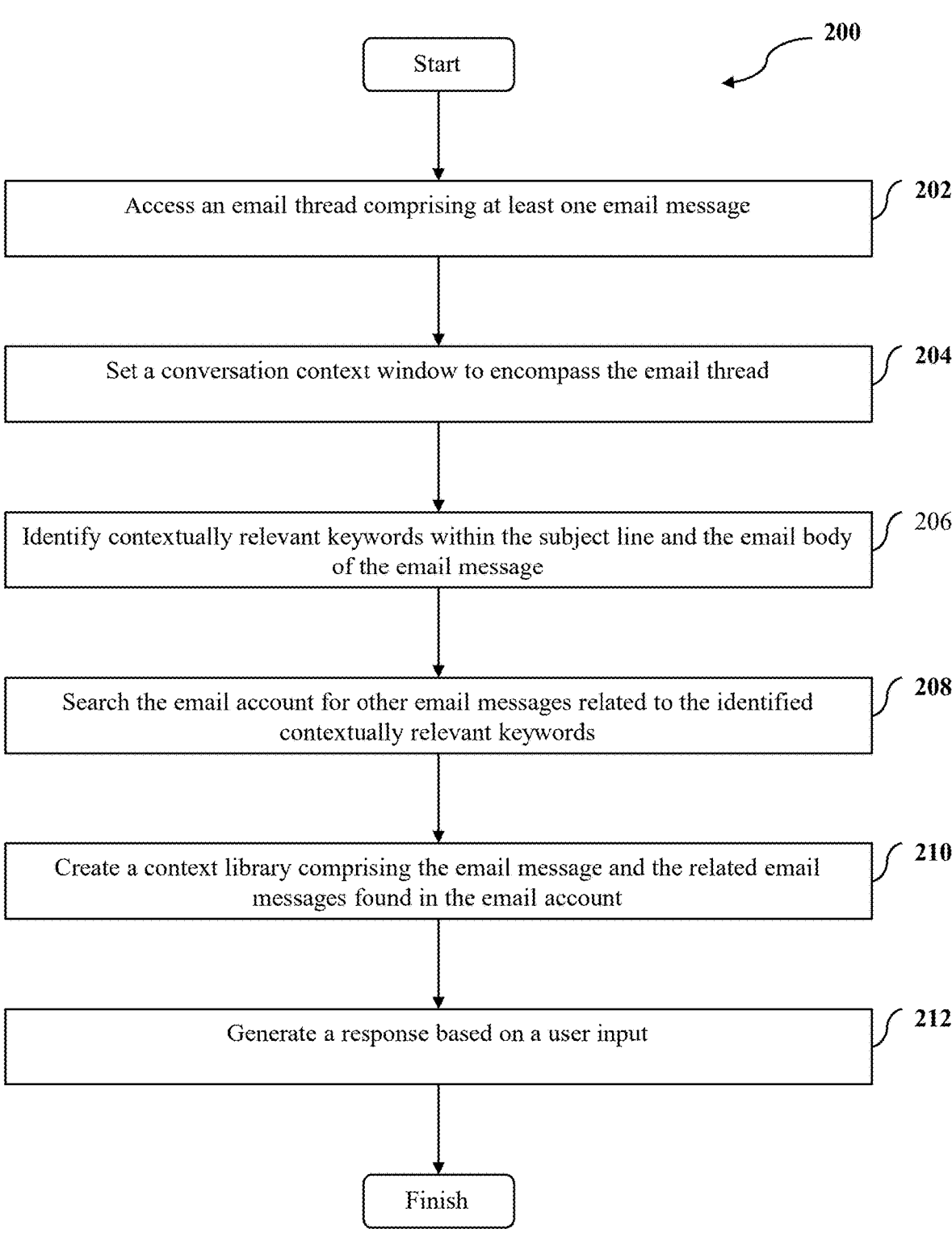

_200_

Start

Access an email thread comprising at least one email message _202_

Set a conversation context window to encompass the email thread _204_

Identify contextually relevant keywords within the subject line and the email body of the email message _206_

Search the email account for other email messages related to the identified contextually relevant keywords _208_

Create a context library comprising the email message and the related email messages found in the email account _210_

Generate a response based on a user input _212_

Finish

FIG. 2

METHODS FOR PROVIDING CONTEXTUALIZED RESPONSES USING AN ARTIFICIAL INTELLIGENCE MODEL WITHIN AN EMAIL ACCOUNT

This application claims the benefit of priority of the U.S. Provisional Patent Application Ser. No. 63/499,545 filed on May 2, 2023, the disclosure of which is incorporated by reference in its entirety for all purposes.

This disclosure relates to a virtual coworker, including context-aware email communication and text processing.

In the field of email communication and management, chatbots have emerged as a valuable tool for streamlining user interactions and providing quick, automated responses to various inquiries. However, conventional chatbot systems cannot often understand and respond to user inputs in a contextually relevant manner, mainly when dealing with complex or multi-faceted email threads. This limitation can lead to responses that are generic, irrelevant, or insufficiently tailored to the user's specific needs, ultimately diminishing the effectiveness and utility of the chatbot. Moreover, conventional chatbot implementations typically embed the interface into a chat window in a web-based application. While appropriate for customer-facing retail, this implementation is outside the workflow for most modern professionals, who mostly use email for complex, written communication.

One challenge in addressing this issue lies in the ability to accurately identify and extract contextually relevant information from email messages and threads and search for and incorporate related email messages from the user's email account. Additionally, generating contextually appropriate responses based on a combination of natural language analysis and pre-programmed prompts presents a significant challenge in delivering a seamless and efficient user experience. Another challenge is to provide these capabilities within existing workflows and no additional training so that professionals can benefit from the new technology immediately without relearning the modality of their work.

The present disclosure addresses these problems by providing a computerized method for generating contextualized responses within an email account. This method involves accessing an email thread, setting a conversation context window, identifying contextually relevant keywords within the email message, searching the email account for related email messages, creating a context library, and generating a response based on user input and a combination of prompts derived from natural language analysis and pre-programmed prompts.

The present disclosure provides a computer-implemented method for providing contextualized responses using a chatbot within an email account. (That is, a "virtual coworker.") The method accesses an email thread, sets a conversation context window to encompass the entire email thread, identifies contextually relevant keywords within the subject line and email body, searches the email account for related email messages, and creates a context library. A response is generated based on user input derived from the context library, using a combination of natural language analysis and pre-programmed prompts.

The present disclosure further provides a non-transient computer-readable storage medium comprising instructions executable by one or more processors to perform a method for providing contextualized responses using a chatbot within an email account. The instructions enable the processors to access an email thread, set a conversation context window, identify contextually relevant keywords, search the email account for related email messages, create a context library, and generate a response based on user input derived from the context library.

The present disclosure also provides a system comprising one or more hardware processors configured by machine-readable instructions to provide contextualized responses using a chatbot within an email account. The processors access an email thread, set a conversation context window, identify contextually relevant keywords, search the email account for related email messages, create a context library, and generate a response based on user input derived from the context library.

By implementing the methods, media, and systems disclosed herein, users can benefit from a more intelligent and context-aware chatbot system capable of providing accurate, relevant, and personalized responses to user inquiries within the context of their email communications. This disclosure enhances the overall effectiveness and utility of chatbot systems in email use and management, leading to, for example, improved user satisfaction and productivity.

Additional embodiments and features are set forth in the following description. In part will become apparent to those skilled in the art upon examination of the specification or learned by the practice of the embodiments discussed herein. A further understanding of the nature and advantages of certain embodiments may be realized by reference to the remaining portions of the specification and the drawings, which form a part of this disclosure.

BRIEF DESCRIPTION OF THE DRAWINGS

The disclosure will be readily understood by the following detailed description in conjunction with the accompanying drawings, wherein like reference numerals designate like structural elements. The drawings provide exemplary embodiments or aspects of the disclosure and do not limit the scope of the disclosure.

FIG. 2 illustrates a method for providing contextualized responses using a virtual coworker within an email account.

DETAILED DESCRIPTION

Figure 1:
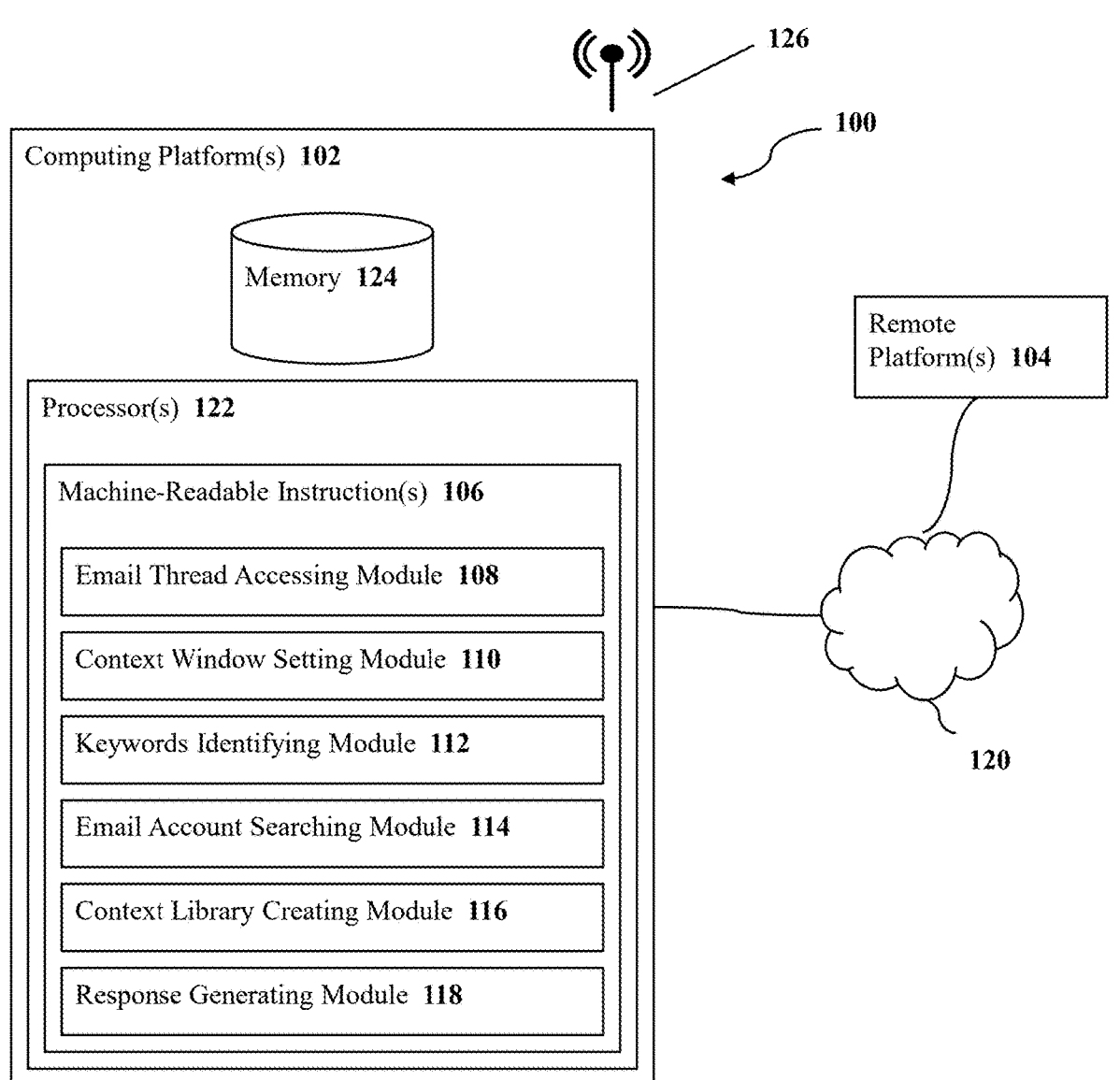
FIG. 1 illustrates a system configured for providing contextualized responses using a virtual coworker within an email account.

Provided herein are computerized methods, media, and systems that provide a context-sensitive virtual assistant which aids efficient communication and streamlines interactions for users. The virtual assistant operates within its own dedicated email account, allowing users to interact with it as they would with a human team member. By leveraging advanced artificial intelligence, the virtual assistant understands the context of email conversations, remembers past interactions, and responds to user inquiries in a manner consistent with a defined role and personality. This innovative approach to email communication offers a user-friendly and efficient alternative to traditional email management systems, providing tech startups and small businesses with valuable resources for enhancing productivity and collaboration.

In certain embodiments, the computerized method disclosed herein provides contextualized responses using a virtual coworker within an email account, the method comprising:

a. accessing an email thread comprising at least one email message, wherein the email message has a source and sender and includes a subject line and an email body;

b. setting a conversation context window to encompass the email thread;

c. identifying contextually relevant keywords within the subject line and the email body of the email message;

d. searching the email account for other email messages related to the identified contextually relevant keywords;

e. creating a context library comprising the email message and the related email messages found in the email account; and f. generating a response based on a user input, wherein the user input is derived from the context library. The response is contextualized using a combination of prompts derived from natural language analysis of the user input and pre-programmed prompts.

A computerized method for providing contextualized responses using a chatbot within an email account, the method comprising: a. accessing an email thread comprising at least one email message, wherein the email message has a source and sender and includes a subject line and an email body; b. setting a conversation context window to encompass the email thread; c. identifying contextually relevant keywords within the subject line and the email body of the email message using a machine learning algorithm trained on a corpus of diverse email messages; d. searching the email account for other email messages related to the identified contextually relevant keywords by comparing the identified keywords with keywords in other email messages using a similarity metric; e. creating a context library comprising the email message and the related email messages found in the email account, wherein the context library is organized based on semantic relationships between the email messages; f. generating a response based on a user input, wherein the user input is derived from the context library, and the response is contextualized using a combination of prompts derived from natural language analysis of the user input and pre-programmed prompts; and g. dynamically updating the context library based on user interactions and newly received email messages to improve the chatbot's response accuracy and relevance.

A computerized method for providing contextualized responses using a chatbot within an email account, the method comprising: a. accessing an email thread comprising at least one email message, wherein the email message has a source and sender and includes a subject line and an email body; c. identifying contextually relevant keywords within the subject line and the email body of the email message using at least one of a machine learning algorithm, rule-based method, or statistical analysis; d. searching the email account for other email messages related to the identified contextually relevant keywords by comparing the identified keywords with keywords in other email messages using at least one of a similarity metric, clustering algorithm, or pattern matching technique; e. creating a context library comprising the email message and the related email messages found in the email account, wherein the context library is organized based on at least one of semantic relationships, topic modeling, or hierarchical structures between the email messages; f. generating a response based on a user input, wherein the user input is derived from the context library, and the response is contextualized using a combination of prompts derived from natural language analysis of the user input and pre-programmed prompts; and g. updating the context library based on user interactions, newly received email messages, or changes in conversation context to improve the chatbot's response accuracy and relevance.

FIG. 1 illustrates a system configured for providing contextualized responses using a chatbot within an email account, in accordance with one or more embodiments. In some cases, system 100 may include one or more computing platforms 102. The one or more remote computing platforms 102 may be communicably coupled with one or more remote platforms 104. In some cases, users may access system 100 via remote platform(s) 104.

The one or more computing platforms 102 may be configured by machine-readable instructions 106. Machine-readable instructions 106 may include modules. The modules may be implemented as one or more of functional logic, hardware logic, electronic circuitry, software modules, and the like. The modules may include one or more of email thread accessing module 108, context window setting module 110, keywords identifying module 112, email account searching module 114, context library creating module 116, response generating module 118, and/or other modules.

Email thread accessing module 108 may be configured to access an email thread comprising at least one email message. The email message has a source and sender and includes a subject line and an email body. Context window setting module 110 may be configured to set a conversation context window to encompass the email thread. Keywords identifying module 112 may be configured to identify contextually relevant keywords within the subject line and the email body of the email message. Email account searching module 114 may be configured to search the email account for other email messages related to the identified contextually relevant keywords. Context library creating module 116 may be configured to create a context library comprising the email message and the related email messages found in the email account. Response generating module 118 may be configured to generate a response based on a user input. In certain embodiments, the user input is derived from the context library, and the response is contextualized using a combination of prompts derived from natural language analysis of the user input and pre-programmed prompts.

In some cases, the one or more computing platforms 102, may be communicatively coupled to the remote platform(s) 104. In some cases, the communicative coupling may include communicative coupling through a networked environment 120. The networked environment 120 may be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms 102 and remote platform(s) 104 may be operatively linked via some other communication coupling. The one or more one or more computing platforms 102 may be configured to communicate with the networked environment 120 via wireless or wired connections. In addition, in an embodiment, the one or more computing platforms 102 may be configured to communicate directly with each other via wireless or wired connections. Examples of one or more computing platforms 102 may include, but is not limited to, smartphones, wearable devices, tablets, laptop computers, desktop computers, Internet of Things (IoT) device, or other mobile or stationary devices. In an embodiment, system 100 may also include one or more hosts or servers, such as the one or more remote platforms 104 connected to the networked environment 120 through wireless or wired connections. According to one embodiment, remote platforms 104 may be implemented in or function as base stations (which may also be referred to as Node Bs or evolved Node Bs (eNBs)). In other embodiments, remote platforms 104 may include web servers, mail servers, application servers, etc. According to certain embodiments, remote platforms 104 may be standalone servers, networked servers, or an array of servers.

The one or more computing platforms 102 may include one or more processors 122 for processing information and executing instructions or operations. One or more processors 122 may be any type of general or specific purpose processor. In some cases, multiple processors 122 may be used per other embodiments. In fact, the one or more processors 122 may include one or more of general-purpose computers, special purpose computers, microprocessors, digital signal processors (DSPs), field-programmable gate arrays (FP-GAs), application-specific integrated circuits (ASICs), and processors based on a multi-core processor architecture, as examples. In some cases, the one or more processors 122 may be remote from the one or more computing platforms 102, such as disposed within a remote platform like the one or more remote platforms 122 of FIG. 1.

The one or more processors 122 may perform functions associated with the operation of system 100 which may include, for example, precoding of antenna gain/phase parameters, encoding and decoding of individual bits forming a communication message, formatting of information, and overall control of the one or more computing platforms 102, including processes related to management of communication resources.

The one or more computing platforms 102 may further include or be coupled to a memory 124 (internal or external), which may be coupled to one or more processors 122, for storing information and instructions that may be executed by one or more processors 122. Memory 124 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 124 can consist of any combination of random access memory (RAM), read only memory (ROM), static storage such as a magnetic or optical disk, hard disk drive (HDD), or any other type of non-transitory machine or computer readable media. The instructions stored in memory 124 may include program instructions or computer program code that, when executed by one or more processors 122, enable the one or more computing platforms 102 to perform tasks as described herein.

In some embodiments, one or more computing platforms 102 may also include or be coupled to one or more antennas 126 for transmitting and receiving signals and/or data to and from one or more computing platforms 102. The one or more antennas 126 may be configured to communicate via, for example, a plurality of radio interfaces that may be coupled to the one or more antennas 126. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

FIG. 2 illustrate an example flow diagram of method 200, according to one embodiment. Method 200 may include accessing an email thread comprising at least one email message at block 202, the email message has a source and sender and includes a subject line and an email body. The method 200 may include setting a conversation context window to encompass the email thread at block 204. Method 200 may include identifying contextually relevant keywords within the subject line and the email body of the email message at block 206. Method 200 may include searching the email account for other email messages related to the identified contextually relevant keywords at block 208. Method 200 may include creating a context library comprising the email message and the related email messages found in the email account at block 210. The method 200 may include generating a response based on a user input at block 212, the user input being derived from the context library, and the response being contextualized using a combination of prompts derived from natural language analysis of the user input and pre-programmed prompts.

In some cases, method 200 may be performed by one or more hardware processors, such as the processors 122 of FIG. 1, configured by machine-readable instructions, such as the machine-readable instructions 106 of FIG. 1. In this aspect, the method 200 may be configured to be implemented by the modules, such as the modules 108, 110, 112, 114, 116 and/or 118 discussed above in FIG. 1.

Figure 3:
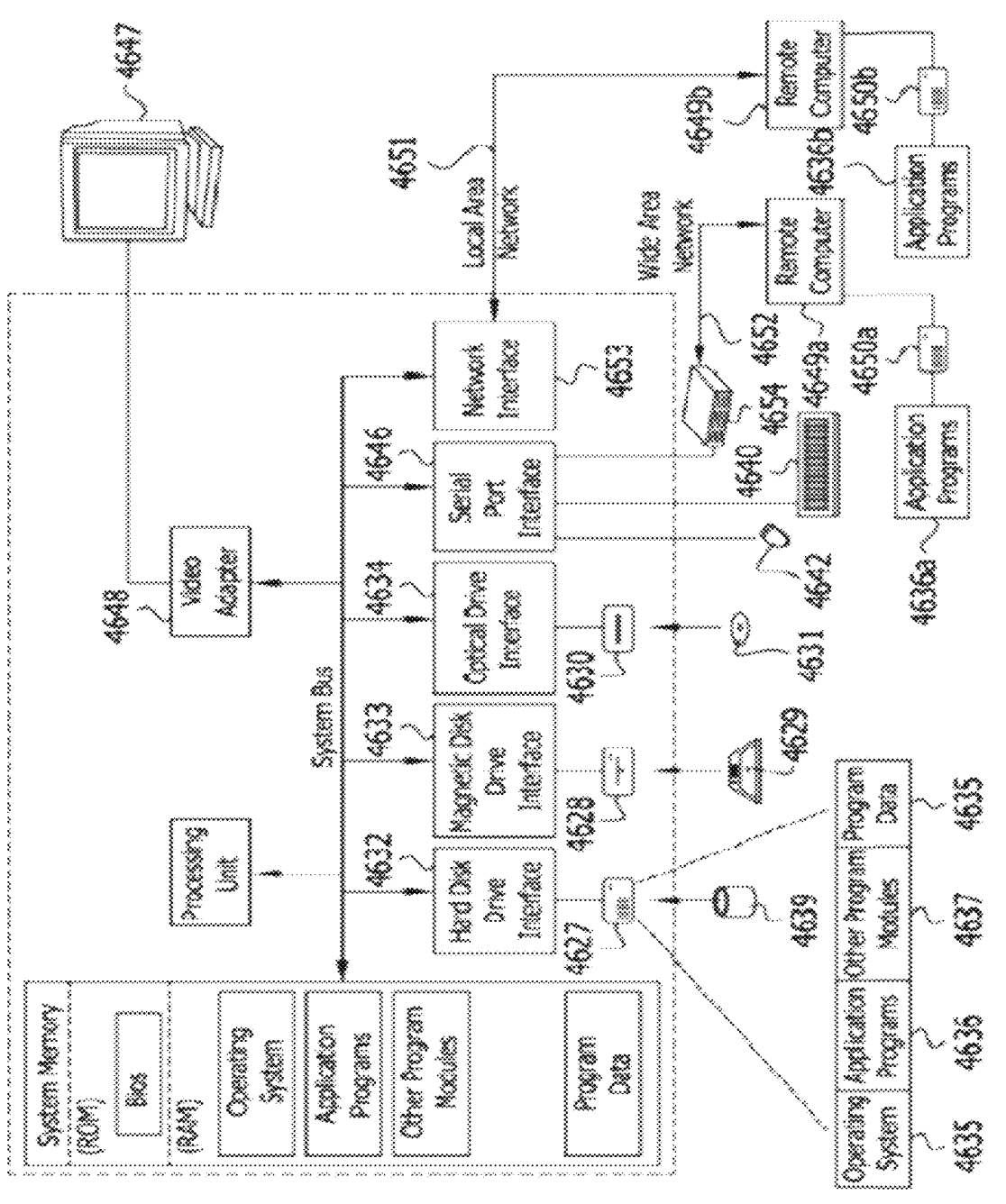
FIG. 3 is a block diagram illustrating an example of a suitable computing system environment in which aspects of the present disclosure may be implemented.

With reference to FIG. 3, an exemplary system for implementing aspects of the disclosure includes a general-purpose computing device in the form of a conventional computer 4620, including a processing unit 4621, a system memory 4622, and a system bus 4623 that couples various system components, including the system memory 4622 to the processing unit 4621. The system bus 4623 may be any of several bus structures, including a memory bus or memory controller, a peripheral bus, and a local bus using various bus architectures. The system memory includes read-only memory (ROM) 4624 and random-access memory (RAM) 4625. A basic input/output system (BIOS) 4626, containing the basic routines that help transfer information between elements within the computer 4620, such as during startup, may be stored in ROM 4624.

The computer 4620 may also include a magnetic hard disk drive 4627 for reading from and writing to a magnetic hard disk 4639, a magnetic disk drive 4628 for reading from or writing to a removable magnetic disk 4629, and an optical disk drive 4630 for reading from or writing to removable optical disk 4631, such as a CD-ROM or other optical media. The magnetic hard disk drive 4627, magnetic disk drive 4628, and optical disk drive 4630 are connected to the system bus 4623 by a hard disk drive interface 4632, a magnetic disk drive-interface 4633, and an optical drive interface 4634, respectively. The drives and their associated computer-readable media provide nonvolatile storage of computer-executable instructions, data structures, program modules, and other data for the computer 4620. Although the exemplary environment described herein employs a magnetic hard disk 4639, a removable magnetic disk 4629, and a removable optical disk 4631, other types of computer-readable media for storing data can be used, including magnetic cassettes, flash memory cards, digital video disks, Bernoulli cartridges, RAMs, ROMs, and the like.

Program code means comprising one or more program modules may be stored on the hard disk 4639, magnetic disk 4629, optical disk 4631, ROM 4624, and/or RAM 4625, including an operating system 4635, one or more application programs 4636, other program modules 4637, and program data 4638. A user may enter commands and information into the computer 4620 through keyboard 4640, pointing device

4642, or other input devices (not shown), such as a microphone, joystick, gamepad, satellite dish, scanner, or the like. These and other input devices are often connected to the processing unit 4621 through a serial port interface 4646 coupled to the system bus 4623. Alternatively, the input devices may be connected by other interfaces, such as a parallel port, a game port, or a universal serial bus (USB). A monitor 4647 or another display device is also connected to system bus 4623 via an interface, such as video adapter 4648. In addition to the monitor, personal computers typically include other peripheral output devices (not shown), such as speakers and printers.

The computer 4620 may operate in a networked environment using logical connections to one or more remote computers, such as remote computers 4649*a* and 4649*b*. Remote computers 4649*a* and 4649*b* may each be another personal computer, a server, a router, a network PC, a peer device, or another common network node. These typically include many or all the elements described above relative to the computer 4620. However, only memory storage devices 4650*a* and 4650*b* and their associated application programs 4636*a* and 4636*b* have been illustrated in FIG. 3. The logical connections depicted in FIG. 3 include a local area network (LAN) 4651 and a wide area network (WAN) 4652 presented here by way of example and not limitation. Such networking environments are commonplace in office-wide or enterprise-wide computer networks, intranets, and the Internet.

When used in a LAN networking environment, the computer 4620 is connected to the local network 4651 through a network interface or adapter 4653. When used in a WAN networking environment, the computer 4620 may include a modem 4654, a wireless link, or other means for establishing communications over the wide area network 4652, such as the Internet. The modem 4654, internal or external, is connected to the system bus 4623 via the serial port interface 4646. In a networked environment, program modules depicted relative to the computer 4620 or portions thereof may be stored in the remote memory storage device. It will be appreciated that the network connections shown are exemplary and other means of establishing communications over wide area network 4652 may be used.

One or more aspects of the disclosure may be embodied in computer-executable instructions (i.e., software), such as a software object, routine, or function (collectively referred to herein as a software) stored in system memory 4624 or nonvolatile memory 4635 as application programs 4636, program modules 4637, and/or program data 4638. The software may alternatively be stored remotely, such as on remote computers 4649*a* and 4649*b* with remote application programs 4636*b*. Generally, program modules include routines, programs, objects, components, data structures, etc., that perform particular tasks or implement particular abstract data types when executed by a processor in a computer or other device. The computer-executable instructions may be stored on a computer-readable medium such as a hard disk 4627, optical disk 4630, solid-state memory, RAM 4625, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

A programming interface (or, more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of another component (s). The term "segment of code" in the preceding sentence is intended to include one or more instructions or lines of code. It includes, e.g., code modules, objects, subroutines, functions, and so on, regardless of the terminology applied or whether the code segments are separately compiled, or whether the code segments are provided as a source, intermediate, or object code, whether the code segments are used in a run-time system or process, or whether they are located on the same or different machines or distributed across multiple machines, or whether the functionality represented by the segments of code are implemented wholly in software, wholly in hardware, or a combination of hardware and software. By way of example, and not limitation, terms such as application programming interface (API), entry point, method, function, subroutine, remote procedure call, and component object model (COM) interface are encompassed within the definition programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing, and content of the information. In this regard, the underlying transport medium itself may be unimportant to the operation of the interface, whether the medium is wired or wireless, or a combination of both, as long as the information is transported in the manner defined by the interface. In certain situations, information may not be passed in one or both directions in the conventional sense, as the information transfer may be either via another mechanism (e.g., information placed in a buffer, file, etc. separate from information flow between the code segments) or non-existent, as when one code segment accesses functionality performed by a second code segment. An aspect applies based on the situation, such as whether the code segments are part of a system in a loosely coupled or tightly coupled configuration. So this list should be considered illustrative and non-limiting.

This notion of a programming interface is known to those skilled in the art and is clear from the provided detailed description. Some illustrative implementations of a programming interface may also include factoring, redefinition, inline coding, divorce, and rewriting, to name a few. There are, however, other ways to implement a programming interface, and, unless expressly excluded, these, too, are intended to be encompassed by the claims set forth at the end of this specification.

"Computing device" refers to any mobile device, such as a smartphone, a cell phone, a pager, a personal digital assistant (PDA, e.g., with GPRS NIC), a mobile computer with a cellular radio, or the like. Atypical mobile device is a wireless data access-enabled device (e.g., an iPhone® smartphone, a Blackberry® smartphone, a Nexus One™ smartphone, an iPad™ device, or the like) capable of sending and wirelessly receiving data using protocols like the Internet Protocol (IP) and the wireless application protocol (WAP). This allows users to access information via wireless devices, such as smartphones, mobile phones, pagers, two-way radios, communicators, etc. Many wireless networks support wireless data access, including, but not limited to, CDPD, CDMA, GSM, PDC, PHS, TDMA, FLEX, ReFLEX, iDEN, TETRA, DECT, DataTAC, Mobitex, EDGE, and other 2G, 3G, 4G, and LTE technologies, and it operates with many handheld device operating systems, such as PalmOS, EPOC, Windows CE, FLEXOS, OS/9, JavaOS, iOS, and Android.

Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smartphone that operates over General Packet Radio Services (GPRS), a data technology for GSM networks. In addition to conventional voice communication, a given mobile device can communicate with another such device via many different types of message transfer techniques, including short message service (SMS), enhanced SMS (EMS), multimedia message (MMS), email WAP, paging, or other known or later-developed wireless data formats. Although many of the examples provided herein are implemented on a mobile device, the examples may similarly be implemented on any suitable "computing device."

Embodiments within the scope of the present disclosure also include computer-readable media and computer-readable storage media for carrying or having computer-executable instructions or data structures stored thereon. Such computer-readable media can be any available media accessed by a general-purpose or special-purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures, and that can be accessed by a general-purpose or special-purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, particular purpose computer, or special purpose processing device to perform a certain function or group of functions.

"Communication media" typically embodies computer-readable instructions, data structures, program modules, or other data in a modulated data signal such as a carrier wave or other transport mechanism and includes any information delivery media.

"Modulated data signal" refers to a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless medium. In addition, combinations of those mentioned above are included within the scope of computer-readable media.

When the subject matter is embodied in the general context of computer-executable instructions, the embodiment may comprise program modules executed by one or more systems, computers, or other devices. Generally, program modules include routines, programs, objects, components, data structures, and the like, which perform particular tasks or implement abstract data types. Typically, the functionality of the program modules may be combined or distributed as desired in various embodiments.

Operating environments in which embodiments of the present disclosure may be implemented are well-known. In a representative embodiment, a computing device, such as a mobile device, is connectable to a transmission functionality that varies depending on implementation. Thus, for example, where the operating environment is a wide-area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores temporarily data required to handle calls set up or received by mobile devices registered with the VLR), a home location register (HLR) (an intelligent database responsible for the management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services for incoming calls. Of course, the present disclosure may be implemented in other and next-generation mobile networks and devices.

The "mobile device" is the physical equipment used by the end-user, typically a subscriber to the wireless network. Typically, a mobile device is a 2.5G-compliant device, 3G-compliant device, or a 4G-compliant device that includes a subscriber identity module (SIM), which is a smart card that carries subscriber-specific information, mobile equipment (e.g., radio and associated signal processing devices), a user interface or a man-machine interface (MMI), and one or more interfaces to external devices (e.g., computers, PDAs, and the like). The mobile device may also include a memory or data store. The presently disclosed subject matter is now described in more detail.

When elements are referred to as being "connected" or "coupled," the elements can be directly connected or coupled together, or one or more intervening elements may also be present. In contrast, when elements are referred to as being "directly connected" or "directly coupled," no intervening elements are present.

In certain embodiments, the context library is analyzed to define the user input, wherein the user input comprises one or more elements chosen from: (i) the email body of the email message; (ii) text from the related email messages; and (iii) an engineered prompt selected based on the context of (i) and (ii).

In certain embodiments, the engineered prompt is chosen from a plurality of prompts and is selected based on the context of the email body and the text from the related email messages.

In certain embodiments, the computerized method further comprises replying to the email message with the response when the response is generated.

In certain embodiments, the context library further comprises a knowledge base, which includes one or more elements chosen from standard practice materials, reference materials, and templates.

In certain embodiments, the computerized method further comprises reading attachments for the email message and the related email messages as part of the user input.

In certain embodiments, the virtual coworker has an initial prompt, and the method further comprises engineering the initial prompt for the response based on one or more factors chosen from identity, tone, context, and boundaries.

In certain embodiments, the virtual coworker is configured to digitally clone a human user by using an initial prompt and email repository of the human user to generate a response that mimics the human user's communication style and knowledge.

In certain embodiments, the computerized method further comprises discerning the source of the at least one email message by identifying the sender as a team member, client, third-party, or autoreply.

In certain embodiments, the email body of the at least one email message, in combination with the sender's identity, is used to determine the response.

In certain embodiments, the response is generated based on the source of the at least one email message, such that the response is tailored to the sender's role and relationship to the user.

In certain embodiments, the method further comprises maintaining a database of sender profiles to aid in discerning the source of the at least one email message and generating the response.

In certain embodiments, the method further comprises applying machine learning algorithms to discern the source of the at least one email message and adapting the response over time.

In certain embodiments, the method further comprises implementing one or more digital security measures.

In certain embodiments, the security measures comprise one or more of the following steps: (a) requiring user authentication using secure credentials; (b) encrypting data at rest and in transit using strong encryption algorithms; (c) implementing access control mechanisms to limit user access and actions based on roles or attributes; (d) deploying intrusion detection and prevention systems to monitor network and system activities; (e) maintaining up-to-date security patches and updates for virtual coworker, email system, and underlying infrastructure; (f) following secure coding practices during development of the virtual coworker and email system; (g) conducting regular security audits and vulnerability assessments; (h) providing security awareness training to users; (i) developing and maintaining an incident response plan; or (j) implementing a data backup and recovery strategy to ensure availability and integrity of the virtual coworker, email account, and context library.

Definitions

When introducing elements of the present disclosure or the embodiments(s) thereof, the articles "a," "an," "the," and "said" are intended to mean that there are one or more of the elements. The terms "comprising," "including," and "having" are intended to be inclusive and mean that there may be additional elements other than the listed elements.

As used herein, "about" means ±20% of the stated value and includes, more specifically, values of ±10%, ±5%, ±2%, and ±1% of the stated value.

As used herein, "access control mechanism" refers to a security technique employed to regulate and manage access to resources, systems, or data within a computer or network environment. Access control mechanisms ensure that only authorized users can perform specific actions or access certain information based on their roles, attributes, or pre-defined policies. Examples of access control mechanisms include role-based access control (RBAC), where permissions are assigned to users based on their roles within the organization, and attribute-based access control (ABAC), where access decisions are made based on the attributes of the user, the requested resource, and the context of the request.

As used herein, "chatbot" refers to a software application, program, or algorithm designed to simulate human-like conversation and user interaction through text or voice-based communication channels. Chatbots leverage natural language processing, artificial intelligence, and machine learning techniques to understand user input, extract relevant information, and generate appropriate responses or actions.

In certain embodiments, AI models for running a chatbot include, but are not limited to, the following:

Sequence-to-Sequence (Seq2Seq) Models: These models are based on recurrent neural networks (RNNs), particularly long short-term memory (LSTM) networks, and are designed to map input sequences to output sequences. Seq2Seq models are commonly used in tasks such as machine translation and can be adapted for chatbot applications to generate contextually relevant responses based on input messages.

Transformer Models: These models rely on self-attention mechanisms to process input and generate output, allowing for more efficient parallelization and improved handling of long-range dependencies in text. Examples of transformer-based models include BERT, GPT-2, GPT-3, GPT-3.5-turbo, GPT-4.0, and T5.

Retrieval-based Models: These models focus on selecting the most appropriate response from a predefined set of responses or an extensive database of conversational data based on the similarity or relevance to the input message. Retrieval-based models can use techniques such as cosine similarity, term frequency-inverse document frequency (TF-IDF), or more advanced neural network-based approaches, such as Dual Encoder Networks, to rank potential responses.

Memory Networks: These models incorporate an external memory component that allows them to store and retrieve information from past interactions, enabling the chatbot to maintain context and generate more coherent and contextually appropriate responses. Examples of memory network-based models include Memory Networks (MemN2N) and End-to-End Memory Networks (E2E-MemN2N).

Reinforcement Learning-based Models: These models learn to generate responses by optimizing a reward function that evaluates the quality of the chatbot's interactions with users. To learn optimal conversational policies, reinforcement learning-based chatbots can use Deep Q-Networks (DQNs) or Proximal Policy Optimization (PPO).

In certain embodiments, these AI models can be combined or adapted to create more sophisticated and effective virtual coworker systems tailored to specific use cases or domains.

As used herein, "boundaries" refers to the capability of the AI or chatbot to discern the source of an email message, such as a team member, client, third-party, or autoreply, and generate a response appropriate for that source. In certain embodiments, the AI is designed to analyze not only the content of the email text but also the context provided by the sender's identity and relationship to the user.

As used herein, "conversation context window" refers to a defined scope or boundary within a communication exchange, such as an email thread or chat conversation, to capture and analyze relevant information for generating context-aware responses. The conversation context window encompasses a specific portion or the entirety of the communication exchange, allowing a chatbot or other automated response system to consider the content, context, and history of the conversation when formulating a response.

As used herein, "context library" refers to a collection of information, data, or resources compiled and organized to provide context for a chatbot or other automated response system when generating or taking actions. For example, the context library may include email messages, related email threads, attachments, user input, knowledge bases, standard practice materials, reference materials, templates, and other relevant sources of information. In certain embodiments, the context library serves as a foundation for natural language analysis, context-aware decision-making, and the selection of appropriate pre-programmed prompts or engineered prompts based on the context of the conversation.

As used herein, "contextually relevant keywords" refers to words, phrases, or terms within a text-based communication, such as an email message or chat conversation, that carry significant meaning or importance in understanding the context, subject matter, or intent of the communication. In certain embodiments, these keywords are identified through natural language processing, text analysis, or machine learning techniques. They are used to establish relationships between different parts of the communication or to search for related information in other sources, such as email threads, knowledge bases, or reference materials.

As used herein, "data backup and recovery strategy" refers to a systematic approach for preserving, securing, and restoring digital information during data loss, corruption, or system failure. In certain embodiments, the strategy is designed to ensure the availability and integrity of critical data by creating redundant copies of the data at predetermined intervals, storing these copies in geographically diverse locations, and employing a combination of hardware and software tools to aid the retrieval and restoration of the data when necessary. In certain embodiments, the recovery process is tailored to meet specific recovery time objectives (RTOs) and recovery point objectives (RPOs), thereby minimizing the impact of data loss on business operations and reducing the risk of permanent data loss.

As used herein, "email thread" refers to a series of interconnected email messages that share a common subject or topic, aiding the organization and tracking of electronic communications between multiple participants. In certain embodiments, an email thread is initiated by an original email message, with subsequent replies and forwards expanding the thread as participants contribute to the ongoing conversation. These messages are typically displayed in a hierarchical or chronological order, enabling recipients to easily follow the progression of the discussion and reference previous messages as needed. In certain embodiments, email threads may include features such as message threading, which groups related messages together based on various criteria, and conversation views, which present the messages visually cohesive and contextually. Email threads can be used across various email clients and platforms, streamlining communication and enhancing user collaboration.

As used herein, "encryption algorithms" refers to a set of mathematical procedures or rules employed to securely encode and decode digital information, ensuring the data's confidentiality, integrity, and authenticity during transmission, storage, or processing. In certain embodiments, an encryption algorithm is based on a symmetric key system, wherein the same cryptographic key is used for both encryption and decryption or an asymmetric key system, wherein distinct but mathematically related keys, known as public and private keys, are used for encryption and decryption, respectively. Encryption algorithms may encompass various techniques, including but not limited to, block ciphers, which encrypt data in fixed-size blocks, and stream ciphers, which encrypt data one bit or byte at a time. Examples of widely-used encryption algorithms include Advanced Encryption Standard (AES), Rivest-Shamir-Adleman (RSA), and Elliptic Curve Cryptography (ECC). In certain embodiments, encryption algorithms are employed in conjunction with cryptographic protocols and standards, such as Secure Sockets Layer (SSL), Transport Layer Security (TLS), and Internet Protocol Security (IPsec), to provide secure communication channels and protect sensitive data from unauthorized access, tampering, or eavesdropping.

As used herein, "engineered prompt" or "pre-programmed prompt" refers to a designed input or stimulus that elicits a specific response or behavior from a user, system, or artificial intelligence (AI) model. In certain embodiments, an engineered prompt is crafted for clarity, relevance, and effectiveness of the response, considering factors such as context, user intent, and the underlying architecture or capabilities of the system or AI model being prompted. Engineered prompts may be employed in various applications, including but not limited to, natural language processing, machine learning, user experience design, and human-computer interaction. In certain embodiments, the creation of engineered prompts involves an iterative process of testing, refining, and evaluating the prompts to ensure that they consistently generate the desired outcomes while minimizing potential biases, ambiguities, or inaccuracies in the responses.

As used herein, "incident response plan" refers to a structured and organized approach for identifying, managing, and mitigating the impact of security incidents or breaches within an organization's information technology infrastructure.

As used herein, "initial prompt" refers to a preliminary input, question, or stimulus provided to a user, system, or artificial intelligence (AI) model designed to initiate a specific response, action, or behavior. In certain embodiments, initial prompts are crafted for clarity, relevance, and effectiveness, considering factors such as context, user intent, and the underlying architecture or capabilities of the system or AI model being prompted. Initial prompts can be employed in various applications, including but not limited to natural language processing, machine learning, user experience design, and human-computer interaction. In certain embodiments, the initial prompt serves as the starting point for an interactive exchange or conversation, with subsequent prompts and responses building upon the foundation established by the initial prompt.

As used herein, "intrusion detection and prevention system (IDPS)" refers to a security solution that monitors, analyzes, and protects network traffic, computer systems, or applications from unauthorized access, misuse, or malicious activities. In certain embodiments, IDPS is designed to detect and respond to potential threats in real-time by employing signature-based, anomaly-based, and behavior-based techniques to identify known and unknown attacks, policy violations, or other security risks. Upon detecting a potential threat, the IDPS may take various actions, such as generating alerts, blocking or quarantining malicious traffic, or reconfiguring security settings to mitigate the risk. In certain embodiments, IDPS solutions can be deployed as network-based, host-based, or cloud-based systems. They may be integrated with other security tools, such as firewalls, security information, event management (STEM)

systems, or endpoint protection platforms, to provide comprehensive and multi-layered protection against various cyber threats.

As used herein, "knowledge base" refers to a centralized repository of structured and unstructured information, data, or expertise collected, organized, and maintained to support various applications, such as problem-solving, decision-making, or information retrieval. In certain embodiments, a knowledge base is efficiently stores, retrieves, and manages knowledge by employing techniques such as indexing, categorization, or semantic tagging, which enable users or systems to quickly locate and access relevant information based on specific queries or criteria.

As used herein, "natural language analysis" refers to extracting meaningful information, patterns, or insights from human-generated text or speech data, enabling computers to understand, interpret, and respond to natural language inputs. In certain embodiments, natural language analysis encompasses a range of techniques and methodologies, including but not limited to, syntactic analysis, which focuses on the grammatical structure of sentences; semantic analysis, which deals with the meaning and context of words and phrases; and pragmatic analysis, which considers the intended purpose and real-world implications of language use.

As used herein, "reference material" refers to a collection of documents, resources, or information sources that provide authoritative, reliable, and accurate knowledge, data, or guidance on a specific subject, topic, or domain. In certain embodiments, reference materials are intended to aid users in understanding, exploring, or applying concepts, principles, or techniques related to their area of interest or expertise. Reference materials can be presented in various formats, including but not limited to, books, articles, reports, manuals, databases, websites, multimedia content, or software tools. In certain embodiments, reference materials may be developed, curated, or maintained by experts, organizations, or institutions that possess specialized knowledge or experience in the relevant field.

As used herein, "secure coding practice" refers to a set of guidelines, principles, and techniques employed by software developers to ensure the creation of robust, reliable, and secure software applications resistant to various security threats, vulnerabilities, and exploits. In certain embodiments, secure coding practices are designed to aid developers in identifying and mitigating potential security risks during the software development lifecycle by promoting the use of secure programming constructs, input validation, error handling, and access control mechanisms, among other measures.

As used herein, "secure credentials" refers to a set of unique, confidential, and verifiable data elements, such as usernames, passwords, tokens, or cryptographic keys, employed by individuals or systems to authenticate their identity and establish their authorization to access specific resources or perform certain actions within a computing environment. In certain embodiments, secure credentials are designed to prevent unauthorized access, data breaches, or other security incidents by ensuring that only legitimate users or entities can access sensitive information, systems, or services. Secure credentials can be managed and protected using various techniques, including but not limited to, encryption, hashing, salting, multi-factor authentication, and secure storage. In certain embodiments, secure credentials may be issued, verified, or revoked by trusted authorities, such as certificate authorities, identity providers, or system administrators, per established policies, standards, or protocols.

As used herein, "security audit" refers to a systematic and comprehensive assessment of an organization's information technology infrastructure, policies, procedures, and controls, to identify potential vulnerabilities, risks, or non-compliance issues that may compromise the confidentiality, integrity, or availability of its critical assets and information. In certain embodiments, a security audit is conducted by internal or external auditors who possess specialized knowledge and expertise in the field of information security and adhere to established standards, frameworks, or guidelines, such as ISO/IEC 27001, NIST SP 800-53, or the Center for Internet Security (CIS) Critical Security Controls.

As used herein, "standard practice material" refers to a collection of guidelines, procedures, methodologies, or best practices widely accepted, recognized, or endorsed by industry experts, professional organizations, or regulatory bodies as being effective, reliable, and appropriate for achieving specific objectives or outcomes within a given field or domain. In certain embodiments, standard practice materials are designed to aid individuals or organizations in the consistent and systematic application of knowledge, techniques, or principles, thereby promoting the quality, efficiency, and safety of their work or operations. Standard practice materials can be presented in various formats, including but not limited to, documents, manuals, handbooks, online resources, or training materials. In certain embodiments, standard practice materials may be subject to periodic review, revision, or validation to ensure they remain up-to-date, relevant, and aligned with the latest research, technological advancements, or regulations.

As used herein, "template" refers to a pre-designed or pre-formatted document, layout, or structure that serves as a starting point, blueprint, or pattern for creating new documents, files, or content while maintaining a consistent style, format, or organization. In certain embodiments, templates are designed to aid users in the efficient and accurate production of various types of materials, such as reports, presentations, spreadsheets, forms, or web pages, by providing standardized elements, placeholders, or instructions that can be customized or replaced with the user's specific data, text, or graphics.

As used herein, "user input" refers to any data, information, or commands provided by a user to a computing system, device, or application, intending to initiate, control, or influence specific actions, processes, or outcomes. In certain embodiments, user input is received through various input mechanisms, such as keyboards, touchscreens, voice commands, gesture recognition, or peripheral devices like mice or game controllers. User input can encompass a wide range of actions, including but not limited to, text entry, selection of options, manipulation of graphical elements, or activation of buttons or controls. In certain embodiments, user input is processed and interpreted by the system or application to determine the appropriate response or action, considering factors such as context, user preferences, or system settings.

As used herein, "security measure" refers to a combination of techniques and practices to protect the virtual coworker and email account against attack, misuse, fraud, and hacking. These techniques and practices may include, but are not limited to, requiring user authentication using secure credentials, encrypting data at rest and in transit using strong encryption algorithms, implementing access control mechanisms to limit user access and actions based on roles or attributes, deploying intrusion detection and prevention systems to monitor network and system activities, maintaining up-to-date security patches and updates for the chatbot software, email system, and underlying infrastructure, following secure coding practices during developing the virtual coworker and email system, conducting regular security audits and vulnerability assessments, providing security awareness training to users, developing and maintaining an incident response plan, and implementing a data backup and recovery strategy to ensure the availability and integrity of the virtual coworker, email account, and context library.

EXAMPLES

Example 1

An algorithm for a computer-implemented method was developed to aid effective email communication and text processing. The email account in this example was created in GoogleSuite under the developer's domain and accessed via the OAuth 2.0 protocol. The algorithm was implemented in Python 3.10.6 and comprised the following functions:

Function A(root): This function was responsible for updating the user input by obtaining the content of the most recent unread email. The function displayed the updated user input and modified the input field accordingly. The function also checked for new emails every 15 seconds (15000 ms).

Function B(prompt): This function processed the conversation history and generated a response using the advanced AI language model GPT-3.5-Turbo developed by OpenAI. The response was based on the user's prompt and relevant conversation history.

Function C(event=None, email_content=None): This function managed the submission of user input, either from the input field or directly from an email. The function displayed the user's input and the AI-generated response in the chat history.

Function D( ): This function imported text from selected input files and combined the text into a single string. The function also displayed the imported text in the chat history.

The algorithm allowed users to communicate with an AI language model through email and efficiently process text from multiple files. The computer-implemented method provided a convenient and user-friendly interface for interacting with the AI language model, resulting in a more streamlined and effective communication process.

Example 2

Step 1: Configure OpenAI and Email Credentials
Configure your environment with the necessary credentials for OpenAI and your email account (for example, using Gmail's IMAP):

```
import openai
import imaplib
import email
openai.api_key='your-openai-api-key'
mail=imaplib.IMAP4_SSL('imap.gmail.com')
mail.login('your-email@gmail.com', 'your-password')
```

Step 2: Access and Read Email Thread
Define a function to access an email account and read the latest email thread:

```
def access_email_thread( ):
    mail.select('inbox')
    status, data=mail.search(None, 'ALL')
```

```
    email_ids=data[0].split( )
    latest_email_id=email_ids[-1]
    status, data=mail.fetch(latest_email id, '(RFC822)')
    raw_email=data[0][1]
    message=email.message_from_bytes(raw_email)
    return message
```

Step 3: Identify Contextually Relevant Keywords
Extract keywords from the email subject and body:

```
def extract keywords(email_message):
    subject=email message['subject']
    body=email_message.get_payload(decode=True)
    # Implement or integrate a keyword extraction method
        here
    # Use simple string methods or a library like NLTK or
        SpaCy for more advanced extraction
    keywords=subject.split( ) # Simplistic approach: split
        the subject into words return keywords
```

Step 4: Search Related Emails
Query the email account for other related emails using keywords extracted:

```
def search_related_emails(keywords):
    related_emails=[ ]
    keyword_query=f'OR    SUBJECT    "{keywords}"
        BODY "{keywords}"'
    status, data=mail.search(None, keyword_query)
    for num in data[0].split( ):
        status, data=mail.fetch(num, '(RFC822)')
        raw_email=data[0][1]
        message=email.message_from_bytes(raw_email)
        related_emails.append(message)
    return related_emails
```

Step 5: Create a Context Library
Combine the emails into a single context library:

```
def create_context_library(initial_email, related_emails):
    context_library=[initial_email]+related_emails
    return context_library
```

Step 6: Generate Contextualized Response
Using OpenAI to generate a response based on user input contextualized with the email content:

```
def generate_response(user_input, context_library):
    prompt=user_input+"\n\n"+" ".join(context library) #
        Creating a combined context
    response=openai.Completion.create(
        engine="gpt-4-turbo",
        prompt=prompt,
        max_tokens=128000
    )
    return response.choices[0].text.strip( )
```

Example 3

Python Installation—Ensure Python is installed on your system.
Package Installation—Install necessary Python packages:

```
pip install numpy pandas nltk transformers gensim ima-
    plib email sqlite3
```

Implementation Steps:
Step 1: Access Email Thread
Packages: imaplib, email
Code:

```
import imaplib, email
def access_email_thread(username, password):
    # Establish connection
    mail=imaplib.IMAP4_SSL('imap.gmail.com')
    mail.login(username, password)
    mail.select('inbox')
    result, data=mail.search(None, 'ALL')
```

```
for num in data[0].split( ):
    result, data=mail.fetch(num, '(RFC822)')
    raw_email=data[0][1]
    email_message=email.message_from_bytes(raw_
        email)
    print(email_message['subject'])
```

Step 2: Set Conversation Context Window

Concept: Use data structures to manage conversation threads.

Code: Implemented as part of the email fetching and processing logic.

Step 3: Identify Contextually Relevant Keywords

Packages: nltk

Code:

```
import nltk
from nltk.corpus import stopwords
from nltk.tokenize import word_tokenize
nltk.download('punkt')
nltk.download('stopwords')
def extract_keywords(text):
    stop_words=set(stopwords.words('english'))
    word_tokens=word_tokenize(text)
    keywords=[word for word in word_tokens if not word
        in stop_words]
    return keywords
```

Step 4: Search for Related Email Messages

Concept: Reuse Step 1 functionality but filter based on keywords.

Step 5: Create Context Library

Concept: Store conversations in a structured format, such as a list or a Pandas DataFrame.

Code:

```
import pandas as pd
context_library=pd.DataFrame(columns=["Subject",
    "Body", "Keywords" ])
```

Step 6: Generate and Send Responses

Packages: transformers

Code:

```
from    transformers    import    GPT2Tokenizer,
    GPT2LMHeadModel
def generate_response(input_text):
    tokenizer=GPT2Tokenizer.from_pretrained('gpt2')
    model=GPT2LMHeadModel.from_pretrained('gpt2')
    inputs=tokenizer.encode(input_text,
        return_tensors='pt')
    outputs=model.generate(inputs, max_length=200)
    return                    tokenizer.decode(outputs[0],
        skip_special_tokens=True)
```

Step 7: Analyze Context Library to Define User Input

In Step 7 the context library is analyzed to closely define the user input and generate accurate and contextually relevant responses. This step ensures that the information used to construct responses is derived comprehensively from the available data.

Objective: To extract and consolidate user input from various elements of the context library, including the email body, related emails, and any engineered prompts to refine response generation.

Data Structures: Use Python's pandas library to handle and manipulate large datasets involving email threads and related messages efficiently.

Extraction of Textual Content: Pull textual content from the email body and other related messages that have been identified as relevant in the context library.

Integration of Engineered Prompts: Depending on contextual analysis, integrate engineered prompts that are based on the email's context to enhance the interaction quality.

Code:

```
import pandas as pd
def define_user_input(context_library):
    # Assuming context_library is a pandas DataFrame
        with columns ['Email Body', 'Related Messages',
        'Engineered Prompts']
    # Concatenate relevant text
    context_text=context_library['Email    Body'].str.cat
        (context_library['Related Messages'], sep=" ")
    # Analyze for additional context-driven engineered
        prompts
    # This is a placeholder for an actual implementation
        which might involve more complex logic
    if 'urgent' in context_text.lower( ):
        context_library['Engineered Prompts']='Please pri-
            oritize this request.'
    else:
        context_library['Engineered    Prompts']='Standard
            response protocol applies.'
    # Merge all input sources into a single user input
        column
    context_library['User    Input']=context_library.apply
        (lambda x: f"{x['Email Body']}{x['Related Mes-
        sages']}{x['Engineered Prompts']}", axis=1)
    return context_library['User Input']
# Example usage
context_library=pd.DataFrame({
    'Email Body': ["Please find the attached report for
        Q1."],
    'Related Messages': ["Previous discussions high-
        lighted the need for budget adjustments."],
    'Engineered Prompts': [" "]
})
user_input=define_user_input(context_library)
print("Defined User Input:", user_input)
```

Text Concatenation: First, the function concatenates texts from the email body and related messages to form a broader context base.

Contextual Prompts: The function analyzes the concatenated text for certain keywords (e.g., 'urgent') to decide an appropriate engineered prompt. This is a simplified example where you would likely have more sophisticated NLP-driven analyses to determine the need for specific prompts based on context.

Combine Inputs: Finally, all text sources, including engineered prompts, are combined into a comprehensive user input string. This user input will be used to generate responses.

Step 8: Reply to the Email Message with the Generated Response

In Step 8, the main action is to automatically reply to an email message using the response generated by the system. This step represents the virtual coworker's capacity to engage in interactive communication with users.

Objective: Automate the process of sending a well-crafted response back to the sender of the email, where the response is constructed based on the analysis performed on the email content and related context.

Email Sending Functionality: Use a combination of Python's built-in smtplib library for sending emails, and the email library for constructing the email message format.

Compose and Send Responses: Construct email messages that include the generated response and format them properly to maintain the normal visual and structural expectations of email communication.

Logging and Error Handling: Incorporate logging for sending activities and handle potential errors such as connection issues, authentication errors, or sending limits.

Code:

```
import smtplib
from email.mime.text import MIMEText
from email.mime.multipart import MIMEMultipart
def send_email_response(user_email, password, recipi-
    ent_email, response_text, subject='Re: Your Inquiry'):
    # set up the SMTP server
    smtp_server=smtplib.SMTP_SSL('smtp.gmail.com',
        465)
    smtp_server.login(user_email, password)
    # Compose message
    message=MIMEMultipart( )
    message['From']=user email
    message['To']=recipient_email
    message['Subject']=subject
    # Add body to email
    message.attach(MIMEText(response_text, 'plain'))
    # Send email
    try:
        smtp_server.send_message(message)
        print(f"Email sent to {recipient_email}")
    except Exception as e:
        print(f"Failed to send email. Error: {e}")
    finally:
        smtp_server.quit( )
# Example usage
send_email_response('your_email@gmail.com', 'your_
    password',
'recipient_email@example.com', 'Here is the response to
    your inquiry . . . ')
```

Email Server Configuration: Set up an SMTP (Simple Mail Transfer Protocol) server instance for sending emails. Here we use Gmail's SMTP server as an example, which requires SSL and a specific port (465).

Email Composition: The email is composed using the MIME (Multipurpose Internet Mail Extensions) standard, where MIMEMultipart is used to construct an email message with different parts (only plain text here).

Sending the Email: The configured email server instance sends the message. The sending process is wrapped in a try-except block to handle possible errors gracefully, and after the process, the SMTP server is properly closed with .quit( ).

Step 9: Use Knowledge Base in Context Library

In Step 9, the virtual coworker integrates a knowledge base into the context library. This knowledge base includes standard practice materials, reference materials, and templates that help to provide more informed, accurate, and contextually relevant responses.

Objective: Augment the context library with a rich set of informational and resource materials that can be referred to or incorporated into the virtual coworker's responses to add depth and precision.

Knowledge Base Setup: Choose appropriate formats and storage mechanisms for different types of knowledge materials (e.g., textual documents, PDFs, databases).

Integration with Context Library: Develop mechanisms to query and retrieve information from the knowledge base during the virtual coworker's processing of emails.

Response Enrichment: Use information from the knowledge base to enhance the content of the responses, providing more detailed answers or referring to standard practices and templates as applicable.

Code:

```
import sqlite3
import json
def setup knowledge_base( ):
    # Connect to SQLite database (or create it if it doesn't
        exist)
    conn=sqlite3.connect('knowledge_base.db')
    c=conn.cursor( )
    # Create table to store knowledge materials
    c.execute("""CREATE TABLE IF NOT EXISTS mate-
        rials (id INTEGER PRIMARY KEY, category
        TEXT, content TEXT)""")
    # Example entry
    c.execute("INSERT INTO materials (category, con-
        tent) VALUES (?, ?)", ('reference_material',
        'Example reference data . . . '))
    conn.commit( )
    conn.close( )
def query_knowledge_base(category):
    conn=sqlite3.connect('knowledge_base.db')
    c=conn.cursor( )
    c.execute("SELECT content FROM materials WHERE
        category=?", (category,))
    items=c.fetchall( )
    conn.close( )
    return items
def enrich_response_with_kb(user_input, category):
    # retrieve related knowledge content
    kb_content=query_knowledge_base(category)
    if kb_content:
        kb_text=kb_content[0][0]
        enriched_response=f"{user_input}\n\nAdditional
            Info: {kb_text}"
    else:
        enriched_response=user input
    return enriched_response
# Example usage
setup_knowledge_base( )
response=enrich_response_with_kb("Here's a response
    based on your inquiry", 'reference_material')
print(response)
```

Knowledge Base Initialization: A SQLite database is set up to store and manage different categories of knowledge materials. This is an example of using a relational database; however, depending on the complexity and types of data, other database systems or storage solutions might be used.

Querying Knowledge Material: The function query_knowledge_base retrieves materials based on a category that can be linked to the context or subject of the incoming email.

Enriching Responses: The enrich_response_with_kb function integrates the knowledge base content into the virtual coworker responses, making them richer and offering supplementary data that could provide greater clarification or details to the end user.

Step 10: Reading Attachments from Emails

In Step 10, the virtual coworker reads attachments from email messages and related emails, which are then considered as part of the user input for generating context-aware responses. Considering email attachments can provide a more comprehensive understanding of the content and context, thereby improving the quality of the response.

Objective: Enhance the virtual coworker's ability to process and include data from attachments in email messages and related emails, allowing it to consider a broader range of information when formulating responses.

Attachment Reading Functionality: Implement functions to detect, download, and read various types of attachments (e.g., PDFs, DOCX, images).

Data Extraction: Depending on the attachment's format, use appropriate libraries to extract text (e.g., PyPDF2 for PDFs, python-docx for DOCX).

Integration with Email Processing: Seamlessly integrate the attachment reading process into the existing email processing workflow, ensuring that data from attachments is considered in context analysis and response generation.

Code:

```
import email
import imaplib
from PyPDF2 import PdfReader
from docx import Document
def download_attachments(msg):
    for part in msg.walk( ):
        if part.get_content_maintype( )=='multipart':
            continue
        if part.get('Content-Disposition') is None:
            continue
        filename=part.get_filename( )
        if filename:
            with open(filename, 'wb') as f:
                f.write(part.get_payload(decode=True))
            print(f'Downloaded {filename}')
            return filename
    return None
def read_pdf(file_path):
    reader=PdfReader(file_path)
    text="
    for page in reader.pages:
        text+=page.extract_text( )
    return text
def read_docx(file_path):
    doc=Document(file_path)
    text=' '.join([paragraph.text for paragraph in doc.paragraphs])
    return text
# Assuming email message is an email.message.Message instance
attachment_file=download_attachments(email_message)
if attachment_file.endswith('.pdf'):
    attachment_text=read_pdf(attachment_file)
elif attachment_file.endswith('.docx'):
    attachment_text=read_docx(attachment_file)
# Incorporate attachment_text into the user input or context analysis
```

Detect and Download Attachments: Function download_attachments checks each part of the email body for file attachments, downloads them, and saves them locally. It returns the path to the saved file.

Read PDF and DOCX Files: Use PyPDF2 to extract text from PDF files and python-docx for DOCX files. These extracted texts are then processed as part of the email content.

Integration: This attachment handling is integrated such that any text extracted from attachments can be included in the formation of the user input or context library, enhancing the virtual coworker's understanding and response.

Step 11: Tailor Initial Prompts Based on Various Factors

In Step 11, the functionality involves dynamically engineering the initial prompts that the virtual coworker uses to respond based on a range of factors, including the sender's identity, the tone of the message, the context, and established communication boundaries. This personalization enhances engagement by making interactions more relatable and appropriate to the situation.

Objective: Develop initial prompts for the virtual coworker that are adaptively generated to reflect the specific nuances of each interaction, thus making the virtual coworker's responses more personalized and contextually appropriate.

Factor Analysis: Implement methods to analyze the sender's identity, detect the tone of the message, understand the overall context, and respect communication boundaries.

Dynamic Prompt Generation: Create a logic system that selects or generates prompts based on the analyzed factors, enabling a tailored response mechanism.

Integration with Response Generation: Ensure that these dynamically created prompts are effectively incorporated into the response generation process.

Code:

```
from textblob import TextBlob
# Example data structure for sender identities and preferred tones
sender_preferences={
    'client@example.com': {'tone': 'formal', 'prompt': 'Dear valued client,'},
    'team_member@example.com': {'tone': 'casual', 'prompt': 'Hey team,'}
}
def analyze_tone(message):
    analysis=TextBlob(message)
    return 'formal' if analysis.sentiment.polarity >0.1 else 'casual'
def generate_prompt(email_message):
    sender=email message['from']
    body=email_message.get_payload(decode=True).decode('utf-8', errors='ignore')
    # Determine the tone of the message
    tone=analyze_tone(body)
    # Fetch sender-specific preferences if available
    preferences=sender_preferences.get(sender, {'tone': tone, 'prompt': 'Hello,'})
    # Adjust prompt based on the tone of the message content
    if tone !=preferences['tone']:
        prompt='Hello,' # Default to a neutral prompt if tones mismatch
    else:
        prompt=preferences['prompt']
    return prompt
# Assume email_message is an email message object
initial_prompt=generate_prompt(email_message)
print("Initial Prompt:", initial_prompt)
```

Tone Analysis: Using libraries like TextBlob, analyze the sentiment of the message body to decide between a formal or casual tone. This simple sentiment analysis could be expanded to more nuanced tone assessments.

Dynamic Prompt Selection: According to the sender's email and previously defined preferences (which could be stored in a database or dictionary as shown), select or adapt the initial prompt.

Integration: Ensure this generated prompt is the starting point in any response composed by the virtual coworker, aligning the opening of the conversation with the sender's profile and message tone.

Step 12: Maintaining a Database of Sender Profiles

In Step 12, the functionality focuses on maintaining and using a database of sender profiles to aid in discerning the source of the email messages and generating tailored responses. This database enriches the virtual coworker's contextual understanding by keeping track of the historical interactions, preferences, and characteristics of different email senders.

Objective: Create and manage a comprehensive database of sender profiles that stores various attributes such as identity, communication preferences, past interactions, and any specific notes that might assist in personalizing the virtual coworker's responses.

Database Setup: Use a relational database management system (RDBMS) like SQLite to store and manage sender profile data.

Profile Data Structure: Define a schema for the sender profiles that include necessary fields such as email address, name, preferred tone, interaction history, and any custom tags or notes.

Information Retrieval & Update: Develop functionalities to efficiently query this database to retrieve sender information during email processing and to update it with new information as interactions progress.

Code:

```
import sqlite3
def setup_database( ):
    conn=sqlite3.connect('sender_profiles.db')
    c=conn.cursor( )
    # Create table
    c.execute('''
        CREATE TABLE IF NOT EXISTS profiles (
            email TEXT PRIMARY KEY,
            name TEXT,
            preferred_tone TEXT,
            interaction_history TEXT,
            custom_notes TEXT
        )
    ''')
    conn.commit( )
    conn.close( )
def update_profile(email, name, tone, history, notes):
    conn=sqlite3.connect('sender_profiles.db')
    c=conn.cursor( )
    c. execute('''
        INSERT INTO profiles (email, name, preferred_
            tone, interaction_history, custom_notes)
        VALUES (?, ?, ?,?, ?)
        ON CONFLICT(email)
        DO UPDATE SET
            name=excluded.name,
            preferred_tone=excluded.preferred_tone,
            interaction_history=excluded.interaction_history,
            custom_notes=excluded.custom_notes;
    ''', (email, name, tone, history, notes))
    conn.commit( )
    conn.close( )
def get_profile(email):
    conn=sqlite3.connect('sender_profiles.db')
    c=conn.cursor( )
    c.execute('SELECT*FROM    profiles    WHERE
        email=?', (email,))
    profile=c.fetchone( )
    conn.close( )
    return profile
# Example usage
setup_database( )
update_profile('example@example.com', 'John  Doe',
    'formal', 'Previous discussions . . . ', 'VIP Client')
profile=get_profile('example@example.com')
print(profile)
```

Database Setup and Management: Create and manage a SQLite database designed to store sender profiles, ensuring that all necessary fields are included for effective profile management and response personalization.

Updating and Retrieving Profiles: Profiles can be updated or retrieved based on sender email addresses. This enables the system to keep track of sender characteristics and preferences, adapting responses according to the stored profile information.

Integration with Chatbot: This database is integrated into the virtual coworker's operational flow, where it accesses sender profiles to tailor responses based on historical data and specific sender attributes, enhancing the relevance and personalization of communications.

Maintaining this database helps the virtual coworker system to recognize individual preferences and interaction history, crucial for providing responses that are not only relevant but also aligned with the sender's expectations and past interactions. This leads to more engaging and fruitful conversations, boosting user satisfaction. Further enhancements might include more sophisticated data analysis tools and real-time profile updates driven by machine learning algorithms.

Final Integration: Integrate all components into a main function that orchestrates the flow of data between steps, handles errors, and ensures robust processing of emails for generating context-aware responses.

This guide offers a template to start building the virtual coworker system. Each step may require further enhancement and optimization based on specific use cases and operational needs.

Although the subject matter has been described in language specific to structural features and/or methodological acts, it is to be understood that the subject matter defined in the appended claims is not necessarily limited to the specific features or acts described above. Rather, the specific features and acts described above are examples of implementing aspects of the present disclosure.

All references, patents, or applications, US or foreign, cited in the application are, because of this, incorporated by reference as if written herein in their entireties. Where any inconsistencies arise, the material disclosed herein controls.

From the preceding description, one skilled in the art can easily ascertain the essential characteristics of this invention. Without departing from the spirit and scope thereof, various changes and modifications of the invention adapt it to various usages and conditions.

What is claimed is:

1. A computerized method for providing contextualized responses using an artificial intelligence model within an email account, the method comprising:

a. accessing an email thread comprising at least one email message, wherein the email message has a source and sender and includes a subject line and an email body;

b. setting a conversation context window to encompass the email thread;

c. identifying contextually relevant keywords within the subject line and the email body of the email message;

d. searching the email account for other email messages related to the identified contextually relevant keywords;

e. creating a context library comprising the email message and the related email messages found in the email account; and f. generating a response based on a user input, wherein the user input is derived from the context library, and the response is contextualized using a combination of prompts derived from natural language analysis of the user input and pre-programmed prompts, wherein the response is generated based on the source of the at least one email message, such that the response is tailored to the sender's role and relationship to the user.

2. The computerized method of claim 1, further comprising implementing one or more digital security measures.

3. The computerized method of claim 2, wherein the security measure comprises one or more of the following steps:

a. requiring user authentication using secure credentials;

b. encrypting data at rest and in transit using strong encryption algorithms;

c. implementing access control mechanisms to limit user access and actions based on roles or attributes;

d. deploying intrusion detection and prevention systems to monitor network and system activities;

e. maintaining up-to-date security patches and updates for an artificial intelligence model, email system, and underlying infrastructure;

f. following secure coding practices during development of the artificial intelligence model and email system;

g. conducting regular security audits and vulnerability assessments;

h. providing security awareness training to users;

i. developing and maintaining an incident response plan; or j. implementing a data backup and recovery strategy to ensure availability and integrity of the artificial intelligence model, email account, and context library.

4. The computerized method of claim 1, wherein the step of identifying contextually relevant keywords is performed using at least one of a machine learning algorithm, a rule-based method, or statistical analysis.

5. The computerized method of claim 1, further comprising analyzing the context library to define the user input, wherein the user input comprises one or more chosen from:

i. the email body of the email message;

ii. text from the related email messages; and iii. an engineered prompt selected based on the context of (i) and (ii).

6. The computerized method of claim 5, wherein the step of analyzing the context library is performed by using at least one of a similarity metric, clustering algorithm, or pattern matching technique.

7. The computerized method of claim 5, wherein the engineered prompt is chosen from a plurality of prompts and is chosen based on the context of the email body and the text from the related email messages.

8. The computerized method of claim 1, further comprising replying to the email message with the response when the response is generated.

9. The computerized method of claim 1, wherein the context library further comprises a knowledge base, the knowledge base comprising one or more chosen from standard practice materials, reference materials, and templates.

10. The computerized method of claim 1, further comprising reading attachments for the email message and the related email messages as part of the user input.

11. The computerized method of claim 1, wherein the artificial intelligence model has an initial prompt, and the method further comprises engineering the initial prompt for the response based on one or more chosen from identity, tone, context, and boundaries.

12. The computerized method of claim 11, wherein the artificial intelligence model is configured to digitally clone a human user by using an initial prompt and email repository of the human user to generate a response that mimics a human user's communication style and knowledge.

13. The computerized method of claim 1, further comprising discerning the source of the at least one email message by identifying the sender as a team member, client, third-party, or autoreply.

14. The computerized method of claim 13, wherein the email body of the at least one email message in combination with the sender's identity to determine the response.

15. A computerized method for providing contextualized responses using an artificial intelligence model within an email account, the method comprising:

a. accessing an email thread comprising at least one email message, wherein the email message has a source and sender and includes a subject line and an email body;

b. setting a conversation context window to encompass the email thread;

c. identifying contextually relevant keywords within the subject line and the email body of the email message;

d. searching the email account for other email messages related to the identified contextually relevant keywords;

e. creating a context library comprising the email message and the related email messages found in the email account;

f. generating a response based on a user input, wherein the user input is derived from the context library, and the response is contextualized using a combination of prompts derived from natural language analysis of the user input and pre-programmed prompts, and further comprising maintaining a database of sender profiles to aid in discerning the source of the at least one email message and generating the response.

16. A computerized method for providing contextualized responses using an artificial intelligence model within an email account, the method comprising:

a. accessing an email thread comprising at least one email message, wherein the email message has a source and sender and includes a subject line and an email body;

b. setting a conversation context window to encompass the email thread;

c. identifying contextually relevant keywords within the subject line and the email body of the email message;

d. searching the email account for other email messages related to the identified contextually relevant keywords;

e. creating a context library comprising the email message and the related email messages found in the email account;

f. generating a response based on a user input, wherein the user input is derived from the context library, and the response is contextualized using a combination of prompts derived from natural language analysis of the user input and pre-programmed prompts, and further comprising applying machine learning algorithms to discern the source of the at least one email message and adapting the response over time.

\* \* \* \* \*